(12) United States Patent
Nishiyama et al.

(10) Patent No.: US 6,949,293 B2
(45) Date of Patent: Sep. 27, 2005

(54) MESOPOROUS SILICA, MESOPOROUS SILICA COMPOSITE MATERIAL, AND PROCESSES FOR PRODUCTION THEREOF

(75) Inventors: Norikazu Nishiyama, Toyonaka (JP); Yasuyuki Egashira, Minoh (JP); Korekazu Ueyama, 6-28-307, Hanayashiki-Tsutsujigaoka, Takarazuka-city, Hyogo-prefecture (JP), 665-0803

(73) Assignees: NGK Insulators, Ltd., Nagoya (JP); Korekazu Ueyama, Takarazuka (JP)

( * ) Notice: Subject to any disclaimer, the term of this patent is extended or adjusted under 35 U.S.C. 154(b) by 330 days.

(21) Appl. No.: 10/068,491

(22) Filed: Feb. 5, 2002

(65) Prior Publication Data

US 2002/0155053 A1 Oct. 24, 2002

(30) Foreign Application Priority Data

Feb. 9, 2001 (JP) .................................. 2001-033190

(51) Int. Cl.$^7$ ................................................. B32B 9/04

(52) U.S. Cl. .................... 428/446; 428/304.1; 428/697

(58) Field of Search ........................... 428/446, 304.1, 428/697

(56) References Cited

U.S. PATENT DOCUMENTS 6,274,207 B1 * 8/2001 Balkus et al. ............... 427/596

FOREIGN PATENT DOCUMENTS

JP            5-503499         6/1993

OTHER PUBLICATIONS

Beck et al., *A New Family of Mesoporous Molecular Sieves Prepared with Liquid Crystal Templates*, J. Am. Chem. Soc. 1992, 114, pp. 10834–10843.

Nishiyama et al., *Mesoporous MCM–48 Membrane Synthesized on a Porous Stainless Steel Support*, Chem. Commun., 1998, pp. 2147–2148.

Nishiyama et al., *A Mesoporous Silica (MCM–48) Membrane: Preparation and Characterization*, Journal of Membrane Science. 182 2001, pp. 235–244.

Nogami et al., *On the Properties of Non–Crystalline Films Containing $TiO_2$ Prepared from Metal Alkoxides*, Yogyo Kyokai Shi, 85 [9] 1977, pp. 448–455 (w/ English Abstract).

Tohge et al., *Preparation of $ZrO_2$ and $ZrO_2$–$SiO_2$ Coating Films by the Sol Gel Method*, The Chemical Society of Japan (11) 1987, pp. 1952–1957 (w/ English Abstract).

Bagshaw, Stephen A. et al., "*Mesoporous [M]–MSU–x metallo–silicate Catalysts by Non–Ionic Polyethylene Oxide Surfactant Templating Acid [$N^o(N^+)X–1^+$ and Base ($N^o M^+I^-$) Catalysed Pathways*," Microporous and Mesoporous Materials, vol. 22, No. 1–3, Jun. 17, 1998, pp. 419–433.

Jones, D.J. et al., "*Surface Characterization of Zirconium-Doped Mesoporous Silica*," Journal of the Chemical Society, Chemical Communications, No. 5, Mar. 7, 1997, pp. 431–432.

(Continued)

Primary Examiner—Stephen Stein
(74) Attorney, Agent, or Firm—Burr & Brown

(57) ABSTRACT

A mesoporous silica has uniform mesopores and a periodic structure, which contains a Zr element in the form of a Si—O—Zr bond and wherein the Zr content in the Si—O—Zr bond, represented by [Zr/(Si+Zr)] is 0.05 to 20 mole %. The mesoporous silica is superior in alkali resistance and is suitably used particularly as a separation membrane (e.g. a ceramic membrane) and a catalytic support for solid-liquid system, in which an alkaline liquid may be used.

5 Claims, 1 Drawing Sheet

OTHER PUBLICATIONS

Janas, J. et al., "Cr–Doped Zr, Si–Mesoporous Molecular Sieves as Catalysts of $CH_2Cl_2$ Oxidation," Catalysis Today 2000, vol. 59, No. 3, 2000, pp. 241–248.

Luan, Zhaohua et al., "Electron Spin Resonance and Diffuse Reflectance Ultraviolet—Visible Spectroscopies of Vanadium Immobilized at Surface Titanium Centers of Titanosilicate Mesoporous," Journal of Physical Chemistry B Materials, Mar. 13, 1997, vol. 101, No. 11, pp. 2020–2027.

Chaudhari, Karuna et al., "Electron Spin Resonance Investigation on the Location and Reducibility of Zirconium in Mesoporous Zr–MCM–41 Molecular Sieves," Journal of Physical Chemistry B, vol. 104, No. 47, Nov. 2000, pp. 11066–11074.

Yusuf, M.M. et al., "Preparation of Mesoporous $TiO_2$ Thin Films by Surfactant Templating," Journal of Non–Crystalline Solids, vol. 285, No. 1–3, Jun. 2001, pp. 90–95.

Honma, I. et al., "Structural Control of Surfactant–Templated Hexagonal, Cubic and Lamellar Mesoporous Silicate Thin Films Prepared by Spin–Casting," Advanced Materials, vol. 12, No. 20, Oct. 16, 2000, pp. 1529–1533.

Liu, J. et al., "Preparation of Continuous Mesoporous Films on Porous and Dense Substrates," Database Accession No. EIX97043434646 XP002225895 *abstract* Materials Research Society Symposium Proceedings; Microporous and Macroporous Materials 1996 Materials Research Society, vol. 431, 1996, pp. 245–250.

* cited by examiner

MESOPOROUS SILICA, MESOPOROUS SILICA COMPOSITE MATERIAL, AND PROCESSES FOR PRODUCTION THEREOF

BACKGROUND OF THE INVENTION AND RELATED ART STATEMENT

The present invention relates to a mesoporous silica, a mesoporous silica composite material, and processes for producing such a silica and such a composite material. More particularly, the present invention relates to a mesoporous silica and a mesoporous silica composite material, both having superior alkaline resistance and being suitably used particularly as a separation membrane (e.g. a ceramic membrane) or a catalytic support for solid-liquid system, in which an alkaline liquid may be used; as well as to processes for producing such a silica and such a composite material.

In recent years, attention has been paid to mesoporous silica with a uniform mesopore structure, typified by MCM-41 (see JP-A-5-503499) and FSM-16 (see J. Am. Chem. Soc., 114, 10834, 1992). Mesoporous silica is synthesized using the micelle structure of a surfactant as a template; therefore, mesoporous silica has a structure in which pores with nano meter size in diameter are arranged periodically, and the size of the pore diameter is dependent upon the carbon chain length of the surfactant. Accordingly, mesoporous silica is characterized in that it has pores with uniform diameter and the diameter can be controlled appropriately. Owing to these characteristics, mesoporous silica is expected to be used as a separation membrane enabling a high selectivity and a catalytic support with high performance; and processes for synthesis of mesoporous silica have been proposed in, for example, Chem. Commun., 2147, 1998 and J. Memb. Sci., 182, 235, 2001.

In some fields using a separation membrane enabling a high selectivity and a catalytic support of high performance, for example, the medicinal field and the food field, alkaline reagents are used. With conventional separation membranes and catalytic supports, however, there have been cases that their washing with such an alkaline reagent is impossible or they have no sufficient durability to the alkaline reagent. Therefore, conventional separation membranes and catalytic supports have not been fully satisfactory in general applicability. No sufficient solution has yet been proposed to solve such a problem.

SUMMARY OF THE INVENTION

The present invention aims at providing a mesoporous silica and a mesoporous silica composite material, both having superior alkaline resistance and being suitably used particularly as a separation membrane (e.g. a ceramic membrane) or a catalytic support for solid-liquid system, in which an alkaline liquid may be used; as well as processes for producing such a silica and such a composite material.

The mesoporous silica has uniform mesopores and a periodic structure, which contains a Zr element in the form of a Si—O—Zr bond. The Zr content in the Si—O—Zr bond, represented by [Zr/(Si+Zr)], is 0.05 to 20 mole %

The mesoporous silica according to the present invention preferably has a particulate form or a filmy form.

The mesoporous silica according to the present invention includes mesopores having diameters between 1.0 to 3.0 nm and the volume of the mesopores is 0.5 to 1.0 cc/g.

The mesoporous silica according to the present invention preferably has an alkaline resistance index of larger than 10 in terms of pH when an alkaline resistance test is conducted and evaluation is made based on the peak intensity appearing at $2\theta=2.5°$ of X-ray diffraction.

The mesoporous silica according to the present invention can be included in a composite material having the mesoporous silica deposited on a porous substrate.

A process for producing a mesoporous silica includes mixing a solution containing a surfactant with a solution or dispersion containing a Si source and a Zr source, and stirring the resulting mixture to form a gel. The gel is placed in a pressure vessel and kept at a predetermined temperature, and calcined to form particles. The particles are molded into a desired shape.

Another process for producing a mesoporous silica composite material includes dipping a porous substrate in a solution or dispersion containing a Si source and a Zr source. The porous substrate and the solution or dispersion containing a Si source and a Zr source is placed into a solution containing a surfactant, and stirred to form a gel. The gel and the porous substrate are placed in a pressure vessel and kept at a predetermined temperature and then calcined.

DETAILED DESCRIPTION OF THE INVENTION

Figure 1A:
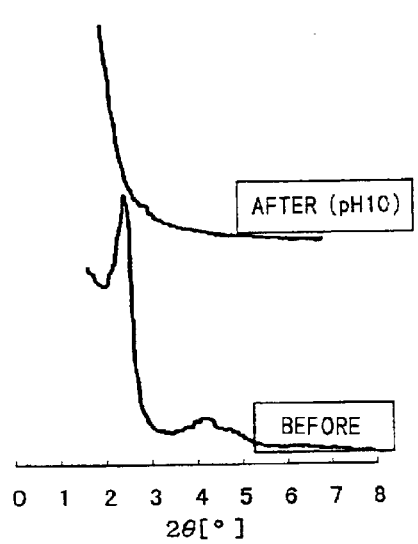
FIGS. 1(a), 1(b), 1(c) and 1(d) are graphs each showing the X-ray diffraction pattern of a mesoporous silica before and after an alkaline resistance test.

Specific description is made below on embodiments of the mesoporous silica, mesoporous silica composite material and processes for producing such a silica and such a composite material, all according to the present invention.

The mesoporous silica of the present invention has uniform mesopores and a periodic structure of an Si—O bond, wherein the Si—O bond contains a Zr element in the form of a Si—O—Zr bond and the Zr content in the Si—O—Zr bond, represented by [Zr/(Si+Zr)], is 0.05 to 20 mole %, and preferably 3 to 5 mole %.

When the Zr content in the Si—O—Zr bond is less than 0.05 mole %, the alkali resistance of the mesoporous silica is insufficient. When the Zr content is more than 20 mole %, the degree of the periodic structure of the mesoporous silica is low.

The Zr content in the Si—O—Zr bond can be measured by dissolving the mesoporous silica in hydrofluoric acid and analyzing the resulting solution using ICP.

The mesoporous silica of the present invention can take a particulate form or a filmy form.

The mesoporous silica may be deposited on a porous substrate to use as a mesoporous silica composite material.

In one process for producing a particulate porous silica, a solution containing a surfactant is mixed and stirred with a solution or dispersion containing a Si source and a Zr source to form a gel. The gel is placed in a pressure vessel and kept at a predetermined temperature. The particles are then calcined and molded into a desired shape.

In one specific process for producing a particulate mesoporous silica, a solution containing a surfactant and a pH-adjusting agent is mixed and stirred with a solution containing a Si source and a Zr source to form a gel. The gel is placed in a pressure vessel and kept at a predetermined temperature. After a predetermined amount of time, the gel is taken out of the vessel and calcined to remove the surfactant present in the pores formed.

In one process for producing a filmy mesoporous silica (a composite material of a porous substrate and a filmy mesoporous silica), a porous substrate is dipped in a solution or dispersion containing a Si source and a Zr source. The porous substrate and the solution or dispersion containing a Si source and a Zr source are added into a solution containing a surfactant and the resulting mixture is stirred to form a gel. The gel and the porous substrate are placed in a pressure vessel and kept at a predetermined temperature, and calcining is conducted.

In one specific process for producing a filmy mesoporous silica (a composite material of a porous substrate and a filmy mesoporous silica), a porous substrate is beforehand dipped in a solution or dispersion containing a Si source and a Zr source. The porous substrate and the solution or dispersion are added into a solution containing a surfactant and a pH-adjusting agent and the resulting mixture is stirred to form a gel. The gel and the porous substrate are placed in a pressure vessel, kept at a predetermined temperature and taken out of the vessel and calcined to obtain a mesoporous silica composite material wherein a mesoporous silica film is deposited on a porous substrate. In this process, in order to obtain a filmy mesoporous silica, it is important that the porous substrate is beforehand dipped in the solution or dispersion containing a Si source and a Zr source. When the porous substrate is not dipped beforehand in the solution or dispersion containing a Si source and a Zr source, only particles of mesoporous silica are formed and no mesoporous silica film is formed on the porous substrate.

As the porous substrate used in the present invention, there can be mentioned, for example, alumina, cordierite, zirconia, titania and stainless steel.

By the above process, a thin film consisting of a mesoporous silica having pore diameters of 1.0 to 2.6 nm can be formed on a porous substrate. This thin film is not peeled off when touched by hand. Incidentally, a particulate mesoporous silica and a filmy mesoporous silica are the same in substance although different in form; therefore, both of them have alkaline resistance.

As the surfactant used in the present invention, there can be mentioned, for example, cetyltrimethylammonium bromide (CTAB), cetyltrimethylphosphonium, octadecyltrimethylphosphonium, benzyltrimethylammonium, cetylpyridinium, myristyltrimethylammonium, decyltrimethylammonium, dodecyltrimethylammonium and dimethyldidodecylammonium and the like.

As the Si source used in the present invention, there can be mentioned, for example, colloidal silica, sodium silicate, silicon alkoxides, tetramethylammonium silicate and tetraethylorthosilicate (TEOS) and the like.

As the Zr source used in the present invention, there can be mentioned, for example, zirconium-containing compounds such as zirconium alkoxide and the like.

As the pH-adjusting agent used as necessary in the present invention, there can be mentioned, for example, acids such as sulfuric acid, hydrochloric acid and the like; and alkalis such as sodium hydroxide, ammonia and the like. Incidentally, the pH of the reaction system in the mesoporous silica production process is preferably adjusted to 1 to 3 when an acid agent is used, and to 10 to 13 when an alkaline agent is used.

With respect to the proportions of the individual components used in producing the mesoporous silica or composite material thereof, of the present invention, the proportion of the pH-adjusting agent (sodium hydroxide) to the Si source, in terms of molar ratio of sodium hydroxide/Si source, is preferably 0.2 to 0.7, more preferably 0.4 to 0.6; and the proportion of the surfactant to the Si source, in terms of molar ratio of surfactant/Si source, is preferably 0.03 to 0.8, more preferably 0.04 to 0.6.

Specifically, when the mesoporous silica produced is MCM-41, the molar ratio of sodium hydroxide/Si source is preferably 0.4 to 0.6, and the molar ratio of surfactant/Si source is preferably 0.04 to 0.1. When the mesoporous silica produced is MCM-48, the molar ratio of sodium hydroxide/Si source is preferably 0.4 to 0.6, and the molar ratio of surfactant/Si source is preferably 0.4 to 0.6.

In producing the mesoporous silica or the composite material thereof, of the present invention, the temperature employed in forming a gel is preferably room temperature to 30° C. When this temperature is too high, the raw materials for the gel may not reach the inside of the pores of the porous substrate.

The formed gel is kept preferably at 20 to 180° C. and, when 90° C. is employed, the keeping time is preferably 48 hours.

The conditions employed in calcining the gel or the gel and the porous substrate are preferably 300 to 500° C. (temperature) and 5 hours (keeping time) when 500° C. is employed.

The present invention is described more specifically below by way of Examples. However, the present invention is in no way restricted by these Examples.

EXAMPLES 1 to 6

Production of Zirconia-containing MCM-41

50 g of deionized water, 0.364 g of cetyltrimethylammonium bromide (CTAB) as a surfactant and 2.5 g of NaOH (4 mol/l) were placed in a beaker and then stirred at 30° C. for 30 minutes to obtain a solution 1. A mixed solution of tetraethylorthosilicate (TEOS) (a Si source) and tetrapropylzirconium (TPOZ) or tetrabutylzirconium (TBOZ) (a Zr source) was added to solution 1. The resulting mixture was stirred at 30° C. for 2 hours to form a gel. The gel was placed in a pressure vessel and allowed to stand at 90° C. for 72 hours. The resulting product was taken out of the pressure vessel and calcined at 500° C. for 4 hours to remove the surfactant (CTAB). XRD diffraction confirmed that the product was MCM-41. The product was measured for mesopore diameter and mesopore volume and also subjected to an alkaline resistance test.

Table 1 shows the proportions of TEOS and TPOZ or TBOZ, the Zr content in zirconia-containing MCM-41, i.e. Zr/(Si+Zr) determined by ICP analysis, the mesopore diameter and mesopore volume of zirconia-containing MCM-41, and the result of the alkaline resistance test of zirconia-containing MCM-41.

EXAMPLES 7 to 12

Production of Zirconia-containing MCM-48

In a beaker were placed 44 g of deionized water, 5.83 g of CTAB and 5.0 g of NaOH (4 mol/l), followed by stirring at 30° C. for 30 minutes to obtain a solution 2. To this solution 2 was added a mixed solution of TEOS and tetrapropylzirconium (TPOZ) or tetrabutylzirconium (TBOZ). The resulting mixture was stirred at 30° C. for 2 hours to form a gel. The gel was placed in a pressure vessel and allowed to stand for 72 hours. The resulting product was taken out of the pressure vessel and fired at 500° C. for 4 hours to remove the surfactant (CTAB). XRD diffraction confirmed that the product was MCM-48. The product was measured for mesopore diameter and mesopore volume and also subjected to an alkaline resistance test.

Table 1 shows the proportions of TEOS and TPOZ or TBOZ, the Zr content in zirconia-containing MCM-48, i.e. Zr/(Si+Zr) determined by ICP analysis, the mesopore diameter and mesopore volume of zirconia-containing MCM-48, and the result of the alkaline resistance test of zirconia-containing MCM-48.

MCM-48. The product was measured for mesopore diameter and mesopore volume and also subjected to an alkaline resistance test.

Table 2 shows the proportions of the individual components used, the mesopore diameter and mesopore volume of MCM-48, and the result of the alkaline resistance test of MCM-48.

TABLE 1

| | Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Si source | TEOS 4.04 | TEOS 3.96 | TEOS 3.75 | TEOS 4.04 | TEOS 3.96 | TEOS 3.75 | TEOS 7.92 | TEOS 7.5 | TEOS 7.08 | TEOS 7.92 | TEOS 7.5 | TEOS 7.08 |
| Zr source | TPOZ 0.26 | TPOZ 0.44 | TPOZ 0.89 | TBOZ 0.27 | TBOZ 0.45 | TBOZ 0.90 | TPOZ 0.53 | TPOZ 0.89 | TPOZ 1.78 | TBOZ 0.54 | TBOZ 0.90 | RBOZ 1.81 |
| Zr/(Si + Zr) | 0.03 | 0.05 | 0.10 | 0.03 | 0.05 | 0.10 | 0.03 | 0.05 | 0.10 | 0.03 | 0.05 | 0.10 |
| Surfactant | CTAB 0.364 | CTAB 0.364 | CTAB 0.364 | CTAB 0.364 | CTAB 0.364 | CTAB 0.364 | CTAB 5.83 | CTAB 5.83 | CTAB 5.83 | CTAB 5.83 | CTAB 5.83 | CTAB 5.83 |
| PH-adjusting agent | NaOH 2.5 | NaOH 2.5 | NaOH 2.5 | NaOH 2.5 | NaOH 2.5 | NaOH 2.5 | NaOH 5.0 | NaOH 5.0 | NaOH 5.0 | NaOH 5.0 | MaOH 5.0 | NaOH 5.0 |
| Product | Zr-MCM-41 | Zr-MCM-41 | Zr-MCM-41 | Zr-MCM-41 | Zr-MCM-41 | Zr-MCM-41 | Zr-MCM-48 | Zr-MCM-48 | Zr-MCM-48 | Zr-MCM-48 | Zr-MCM-48 | Zr-MCM-48 |
| Mesopore diameter | 2.6 | | | | | | 2.8 | | | | | |
| Mesopore volume | 0.9 | | | | | | 1.0 | | | | | |
| Alkaline resistance | pH 11.5 | pH 11.5 | pH 11.5 | pH 11.5 | pH 11.5 | pH 11.5 | pH 11.5 | pH 11.5 | pH 11.5 | pH 11.5 | pH 11.5 | pH 11.5 |

COMPARATIVE EXAMPLE 1

Production of MCM-41

In a beaker were placed 50 g of deionized water, 0.364 g of CTAB and 2.5 g of NaOH (4 mol/l), followed by stirring at 30° C., to obtain a solution 3. 30 minutes later, 4.17 g of TEOS was added to the solution 3, and the resulting mixture was stirred at 30° C. for 2 hours to form a gel. The gel was placed in a pressure vessel and allowed to stand at 90° C. for 72 hours. The resulting material was taken out of the pressure vessel and calcined at 500° C. for 4 hours to remove the surfactant (CTAB). XRD diffraction confirmed that the product was MCM-41. The product was measured for mesopore diameter and mesopore volume and also subjected to an alkaline resistance test.

Table 2 shows the proportions of the individual components used, the mesopore diameter and mesopore volume of MCM-41, and the result of alkaline resistance test of MCM-41.

COMPARATIVE EXAMPLE 2

Production of MCM-48

In a beaker were placed 44 g of deionized water, 5.83 g of CTAB and 5 g of NaOH (4 mol/l), followed by stirring at 30° C., to obtain a solution 4. 30 minutes later, 8.33 g of TEOS was added to the solution 4, and the resulting mixture was stirred for 2 hours to form a gel. The gel was placed in a pressure vessel and allowed to stand at 90° C. for 72 hours. The resulting material was taken out of the pressure vessel and calcined at 500° C. for 4 hours to remove the surfactant (CTAB). XRD diffraction confirmed that the product was

TABLE 2

| | Comparative Examples | |
|---|---|---|
| | 1 | 2 |
| Si source | TEOS 4.17 | TEOS 4.17 |
| Surfactant | CTAB 0.364 | CTAB 5.83 |
| pH-adjusting agent | NaOH 2.5 | NaOH 5.0 |
| Product | MCM-41 | MCM-48 |
| Mesopore diameter | 2.7 | 2.4 |
| Mesopore volume | 0.8 | 0.9 |
| Alkaline resistance | Broken at pH 10 | Broken at pH 10 |

The measurements of the mesopore diameter and mesopore volume of each product, the XRD diffraction for identification of each product, and the alkaline resistance test for each product were conducted as follows:

Mesopore diameter: Calculated from the adsorption isotherm of $N_2$ at 77 K according to the BJH method;

Mesopore volume: Calculated from the amount of adsorbed $N_2$ at 77 K;

XRD diffraction: Measured in a 2θ range of 15.8 to 8°, using $CuK_\alpha$; and

Alkaline resistance test: Solutions of pH 10 to 11.5 each comprising $NaHCO_3$ and NaOH were prepared. 0.1 g of a sample was placed in 10 ml of each solution, followed by stirring at 30° C. for 3 hours and drying. The resulting material was subjected to XRD diffraction to confirm whether or not the structure of the sample was maintained.

Figure 1B:
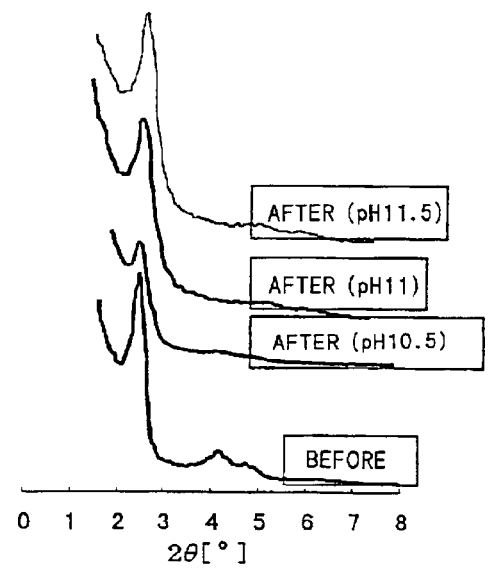
Figure 1C:
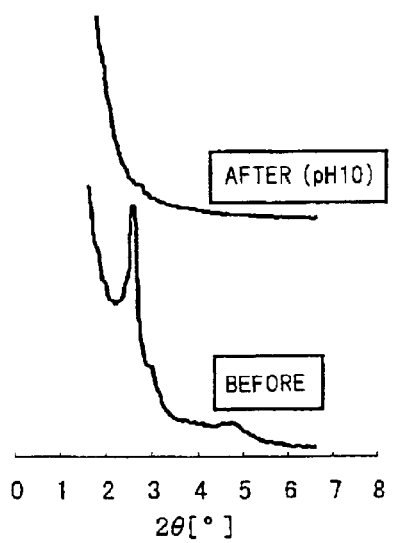
Figure 1D:
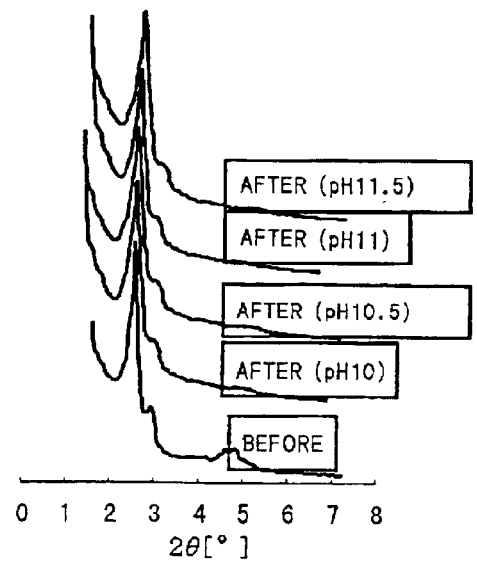

FIGS. 1(a), 1(b), 1(c) and 1(d) show the X-ray diffraction patterns of mesoporous silicas before and after the alkaline resistance test. In FIGS. 1(a), 1(b), 1(c) and 1(d), the axis of ordinate refers to a peak intensity and the axis of abscissa refers to 2θ. FIGS. 1(a), 1(b), 1(c) and 1(d) are the X-ray diffraction patterns before and after the alkaline resistance test, obtained in Comparative Example 1, Example 1, Comparative Example 2 and Example 2, respectively. In Comparative Examples 1 and 2, the structure of mesoporous silica was broken at pH 10; in contrast, in Examples 1 and 2, the structure of mesoporous silica was maintained even at pH 11.5.

A described above, the present invention provides a mesoporous silica and a mesoporous silica composite material, both having superior alkaline resistance and being suitably used particularly as a separation membrane (e.g. a ceramic membrane) or a catalytic support for solid-liquid system, in which an alkaline liquid may be used; as well as processes for producing such a silica and such a composite material.

What is claimed is:

1. A mesoporous silica composite material, comprising:
   a porous substrate; and
   a mesoporous silica deposited on said porous substrate, said mesoporous silica exhibiting alkaline resistance, having uniform mesopores and a periodic structure and including a Zr element in the form of a Si—O—Zr bond, wherein an amount of Zr in said Si—O—Zr bond, represented by [Zr/(Si+Zr)], is in a range of 0.05 to 20 mole %.

2. A mesoporous silica composite material according to claim 1, wherein said mesoporous silica has one of a particulate form and a filmy form.

3. A mesoporous silica composite material according to claim 1, wherein diameters of said mesopores of said mesoporous silica are in a range of 1.0 to 3.0 nm and a volume of the mesopores of said mesoporous silica is in a range of 0.5 to 1.0 cc/g.

4. A mesoporous silica composite material according to claim 1, wherein said mesoporous silica has an alkaline resistance index of larger than 10 in terms of pH when an alkaline resistance test is conducted and evaluation is made using X-ray diffraction based on an X-ray diffraction peak intensity appearing at 2θ=2.5°.

5. A mesoporous silica composite material according to claim 1, wherein said mesoporous silica is formed by mixing, as starting materials, a solution including a surfactant and at least one of a solution including a Si source and a Zr source and a dispersion including a Si source and a Zr source to form a gel and then further processing said gel to produce said mesoporous silica.

* * * * *